US006920629B2

(12) United States Patent
Kraffert

(10) Patent No.: US 6,920,629 B2
(45) Date of Patent: Jul. 19, 2005

(54) CAPTURING FIELDS FROM AN OUTPUT OF A SOFTWARE APPLICATION

(75) Inventor: Mark J. Kraffert, Meridian, ID (US)

(73) Assignee: Micron Technology, Inc., Nampa, ID (US)

( * ) Notice: Subject to any disclaimer, the term of this patent is extended or adjusted under 35 U.S.C. 154(b) by 810 days.

(21) Appl. No.: 09/769,556

(22) Filed: Jan. 25, 2001

(65) Prior Publication Data

US 2002/0099978 A1 Jul. 25, 2002

(51) Int. Cl.[7] .............................................. G06F 9/44
(52) U.S. Cl. ....................... 717/124; 717/125; 717/126
(58) Field of Search ................. 717/114, 115, 717/120, 124–129, 133; 707/100, 104

(56) References Cited

U.S. PATENT DOCUMENTS

| | | | | |
|---|---|---|---|---|
| 5,021,997 A | * | 6/1991 | Archie et al. ................. 714/31 |
| 5,319,645 A | * | 6/1994 | Bassi et al. .................... 714/38 |
| 5,410,681 A | * | 4/1995 | Jessen et al. ................. 703/27 |
| 5,669,000 A | * | 9/1997 | Jessen et al. ............... 717/127 |
| 5,781,720 A | * | 7/1998 | Parker et al. ................ 714/38 |
| 6,106,460 A | * | 8/2000 | Panescu et al. ............. 600/300 |
| 6,389,311 B1 | * | 5/2002 | Whayne et al. ............. 600/523 |
| 6,625,598 B1 | * | 9/2003 | Kraffert ......................... 707/3 |

OTHER PUBLICATIONS

Garrett, "An interpretive/ interactive subroutine system for raster graphics", ACM Sym on Graphics Language, vol. 10, issue 6, pp 101–105, Apr. 1976.*
Vrolijk et al, Fast time dependent isosurface extraction and rendering, ACM, pp 45–54, 2004.*
Pike, Graphics in overlapping bitmap layers, ACM Trans. on Gaphics, vol. 2, No. 2, pp 331–356, Apr 1983.*
Demsky et al, Aumatic detection and repair of errors in data structure, ACM OOPSLA, pp 78–95, 2003.*

* cited by examiner

*Primary Examiner*—Anil Khatri
(74) *Attorney, Agent, or Firm*—Trop, Pruner & Hu, P.C.

(57) ABSTRACT

A test environment comprises a terminal coupled to a database system over a communications link. A software application under test is executable in the database system. In one example, a Telnet session is established between the terminal and the database system, with a bitmap representing an output of the software application communicated to the terminal. To perform a test procedure, the terminal extracts a value from a predefined region of the bitmap.

23 Claims, 3 Drawing Sheets

CAPTURING FIELDS FROM AN OUTPUT OF A SOFTWARE APPLICATION

TECHNICAL FIELD

The invention relates to capturing fields in outputs of a software application.

BACKGROUND

Information technology has become an integral part of many businesses. For example, for vendors of goods or services, information technology software applications can track customer orders, from the point of order through manufacturing to shipping. Many applications are generally mission-critical in the sense that inadequate performance or failure of such applications may adversely impact a business. Software applications are becoming increasingly sophisticated and complex, and thus become more prone to failure if not tested properly.

Some test packages enable the creation of scripts by test engineers to test various software applications. In one example, an application under test may be running in a database system, while the test scripts are executed in a client system. In some cases, it may be difficult to capture various fields that are generated by the application under test. A need thus exists for an improved method and apparatus for capturing output values from an application under test.

SUMMARY

In general, a method of performing a test comprises receiving a bitmap representing an output of a software application under test and extracting a value from a region of the bitmap. A test procedure is performed using the extracted value.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
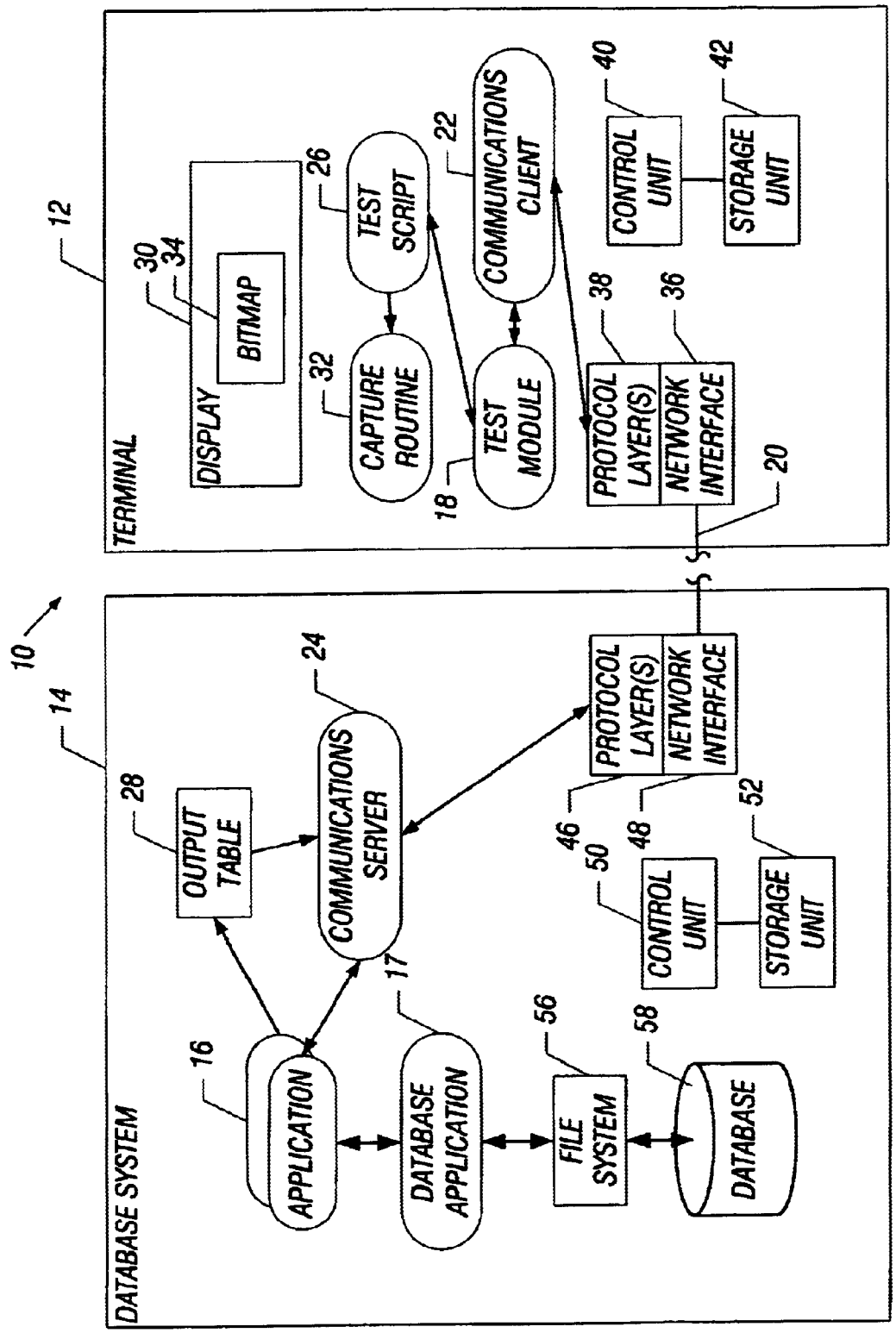
FIG. 1 is a block diagram of one embodiment of a test environment including a database system in which an application under test is executed and a terminal in which a test module is executed.

Referring to FIG. 1, an example test environment 10 includes one or more terminals 12 that are coupled to a database system 14 containing software applications 16 and a database application 17. The software applications 16 are capable of performing various tasks, such as generating a sales order entry, generating an invoice, and so forth. The database application 17 in one example is an Oracle database application.

The terminal 12 includes a test module 18 that is able to perform tests of software applications 16 in the database system 14. In one example embodiment, the test module 18 is the WINRUNNER testing tool from Mercury Interactive Corporation. In other embodiments, other types of testing tools can be executed in the terminal 12.

In performing tests, the test module 18 establishes a communications session with the database system 14 over a communications link 20. The communications session is established between a communications client 22 in the terminal 12 and a communications server 24 in the database system 14. In one embodiment, the communications session is a Telnet session, which involves terminal emulation over a network. In terminal emulation, a client (the terminal 12) behaves as though it is a terminal of another computer (the host), which in the example of FIG. 1 is the database system 14. Thus, once a Telnet session is established, the terminal 12 is able to access files and software in the database system 14. In other embodiments, other types of communications sessions are possible over the communications link 20 between the terminal 12 and the database system 14.

An application 16 is tested by the test module 18 using one or more test scripts 26 running in the terminal 12. The test module 18 tests the application 16 by operating the application automatically so that the applications 16 steps through various stages of operation. In one example, the application 16 is a concurrent manager application that manages concurrent execution of tasks within the database system 14. During execution, the concurrent manager application 16 generates output results (in the form of a table for example) 28 that are displayable in a display 30 of the terminal 12. Generally, the output table 28 of the concurrent manager application 16 includes the identifiers of tasks running in the database system and various fields associated with each task.

In testing the concurrent manager application 16, the test script 26 may need to capture the actual values or states of fields in the output table 28. In a Telnet session, however, data representing the output table 28 are communicated to the terminal 12 for display as a bitmap 34. In other words, the terminal 12 sees the output table 28 as a digital representation that can be rendered for display in the terminal 12. The terminal 12 is generally unaware of what is actually being displayed. As a result, a mechanism is generally not available for the test script 26 or test module 18 to readily access desired fields in the output table 28 for use in a test. However, in accordance with some embodiments, a capture routine 32 is executable in the terminal 12 to enable the capture of specific fields in the output table 28, even though the output table 28 exists in the terminal 12 only as the bitmap 34. Generally, the capture routine 32 captures desired fields of the output table 28 by retrieving data from a specific region in the bitmap 34. The capture routine 32 is called by the test module 18 or by a test script 26.

As further shown in FIG. 1, the terminal 12 also includes a network interface 36 that is coupled to the communications link 20. One or more protocol layers 38 are provided above the network interface 36. For example, the protocol layers 38 may include an Ethernet layer and an Internet Protocol (IP) layer. The software routines and modules (e.g., 18, 22, 26, 32) in the terminal 12 are executable on a control unit 40, which is coupled to a storage unit 42 for storing data and instructions.

The database system 14 similarly includes a network interface 44 and protocol layer(s) 46. The software routines or modules in the database system 14 (e.g., 16, 17, 24) are executable on a control unit 50, which is coupled to a storage unit 52. The database system 14 further includes a file system 56 that enables access to a database 58. The database 58 may be stored in the storage unit 52 or in another storage unit in the database system 14.

Figure 2:
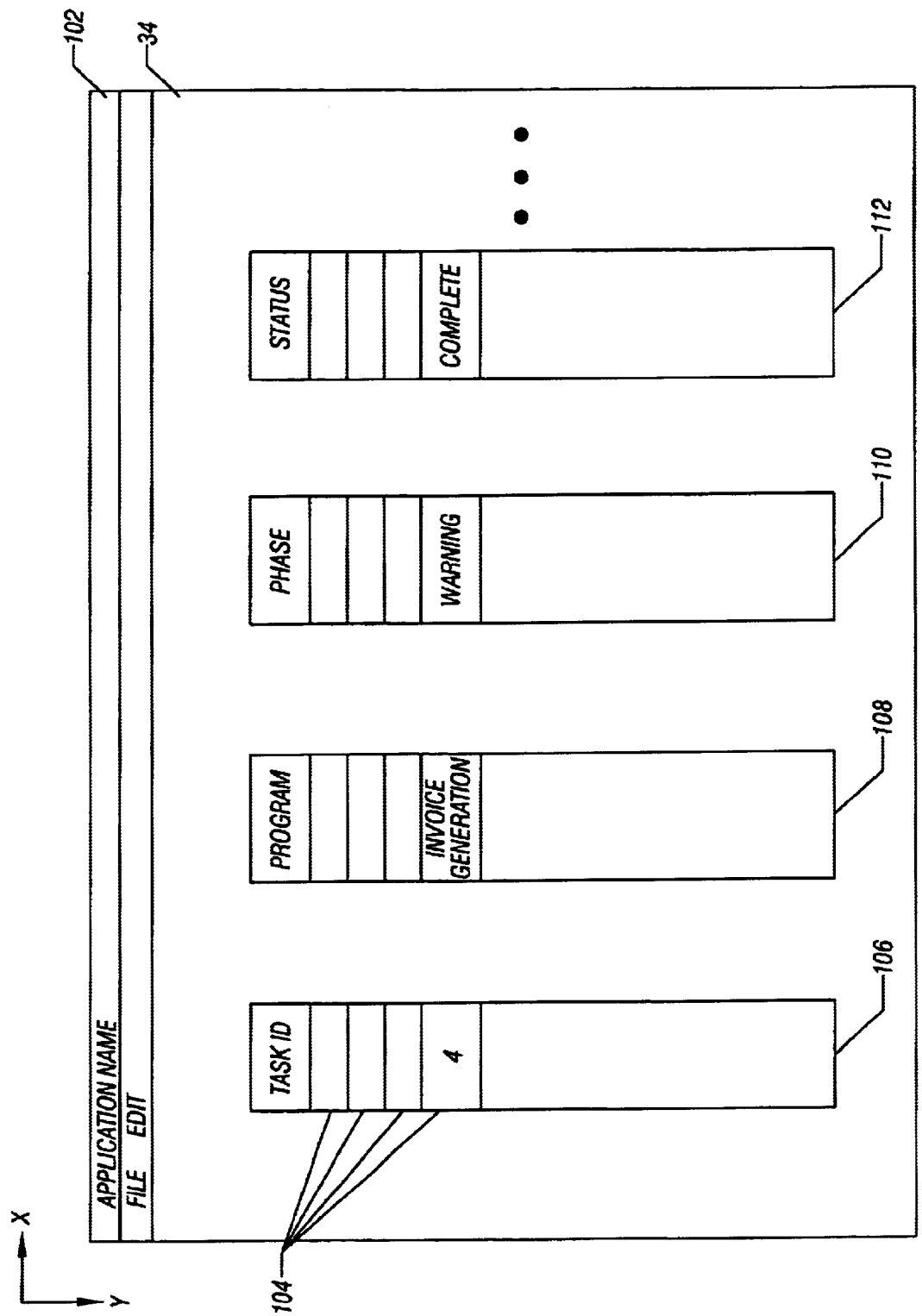
FIG. 2 illustrates a window presented in a display of the terminal, the window containing an output produced by the application under test.

Referring to FIG. 2, a window 102 displayable in the display 30 of the terminal 12 is illustrated. The window 102 contains the bitmap 34 that represents the output table 28. As used herein, the bitmap 34 is also referred to as the "represented table 34" to indicate that the bitmap 34 is a digital representation of the output table 28 generated by the concurrent manager application 16 in the database system 14.

The represented table 34 contains plural rows 104 and plural columns corresponding to different fields. A first column 106 contains the identifiers of corresponding tasks (referred to as "task IDs"). Another column 108 contains the names of the tasks, a column 110 contains a phase field for each task, and a column 112 contains a status field for each task. The status field indicates the status of the task (e.g., complete, active, etc.), and the phase field indicates whether the task ran normally (without a warning) or whether execution of the task caused generation of some warning.

The represented table 34 is rendered as an array of pixels having a predetermined format. For example, the array may have a predetermined number of lines representing a portion of the represented output table 34. Each field of the represented output table 34 is located in a region of the array bounded by a rectangle having corners defined by corresponding (X,Y) coordinates.

The coordinates of the various fields in the represented table 34 are communicated to the capture routine 32. Thus, in response to a request for a particular field in the represented table 34, the capture routine 32 extracts the field value from a physical area of the screen.

Figure 3:
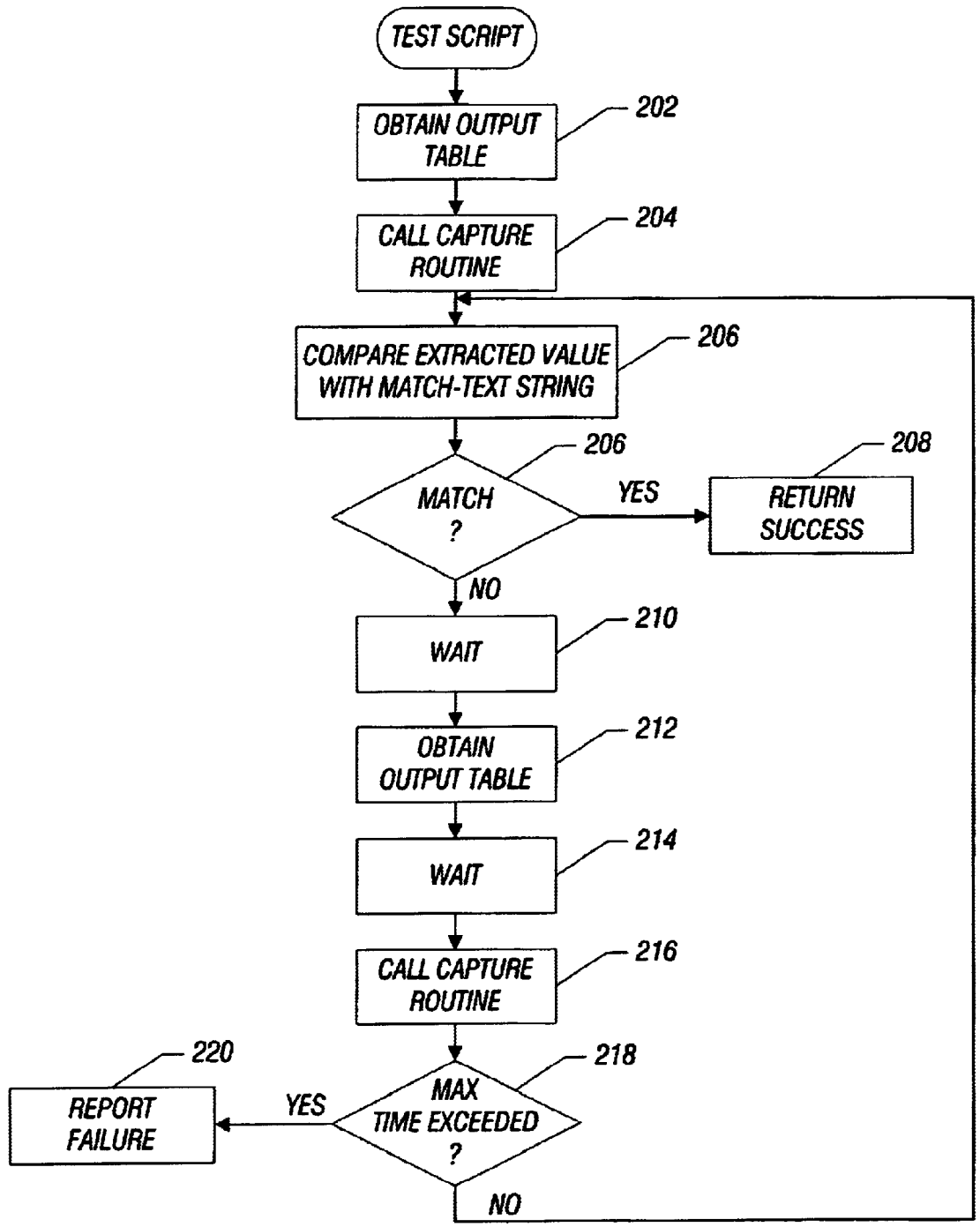
FIG. 3 is a flow diagram of a test script executable in the terminal of FIG. 1.

Referring to FIG. 3, a process performed by the test script 32 according to one example is illustrated. In the example of FIG. 3, the test script 32 is directed to match an extracted field from the represented output table 34 to a string contained in Match_Text. The string Match_Text is communicated to the test script 32, either in an argument when the test script 32 is invoked or by retrieving the string from a predetermined memory or storage location. In other embodiments, other test procedures are performed.

The test script 32 initially issues (at 202) a command that is communicated to the concurrent manager application 16 to obtain the output table 28 for a specific test. The bitmap 34 representing the output table 28 is communicated to the terminal 32 for presentation in the display 30.

Next, the test script 26 calls (at 204) the capture routine 32 to extract the value for a specific field in the output table 28. The following are the arguments that are passed with the call to the capture routine 32: an object representing the window name (of the window 102 in FIG. 2, for example); a text string containing the returned text corresponding to the value or state of the field of interest; the X coordinate of the upper-left corner of the rectangle defining the region of the displayed screen in which the field of interest is located; the Y coordinate of the upper-left corner of the rectangle; the X coordinate of the lower-left corner; and the Y coordinate of the lower-left corner of the rectangle. The X and Y axes are illustrated in FIG. 2. Thus, the Y coordinate specifies a column of pixels and the X coordinate specifies a row of pixels.

In one embodiment, the Y coordinates of the upper-left corner and lower-left corner of the rectangle are stored in a TopLine array and a BotLine array, respectively. Assuming that there is a predetermined number of lines in the displayed array containing the represented output table 34, an index LineNumber can be used to index to a Y coordinate position in each corresponding array.

The extracted value from the bitmap 34 is then compared with the string Match_Text (at 205). If a match occurs, as determined at 206, a success indication is returned (at 208) However, if a match does not occur, then the test script 26 waits (at 210) a predetermined period of time. The test script 26 then obtains (at 212) again an updated output table 28. After another predetermined wait period (at 214), the test script 26 calls (at 216) the capture routine to extract a portion of the bitmap 34 corresponding to the desired field from the output table 28.

The test script 26 next checks (at 218) if a maximum allowable time has been exceeded. This check ensures that the test script 26 does not hang. If the maximum time has expired, then the test script returns (at 220) a fail indication. Otherwise, the test script 26 proceeds back to act 205 to check the newly extracted data with the Match_Text string. The process is repeated until a successful match has been identified or a time-out occurs.

One of the benefits of various embodiments is the ability to automatically refresh the output of the application under test, by looping in the test script 26 until the time-out condition occurs. This avoids an operator performing the test from having to manually refresh the displayed output until a match is identified. Also, different fields in the output can be easily extracted by specifying which line is of interest when calling the capture routine.

The various software routines or modules are executable on corresponding one or more control units in the database system. Each of the control units includes a microprocessor, a microcontroller, a processor card (including one or more microprocessors or microcontrollers), or other control or computing devices. As used here, a "controller" refers to hardware, software, or a combination of both. A "controller" can refer to a single component or to plural components (whether software or hardware).

The storage units or devices referred to herein include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules are stored in respective storage units. The instructions when executed by a respective control unit cause the corresponding system to perform programmed acts.

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software routines or modules. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A device capable of communicating over a link to a system containing a routine under test, the routine under test generating an output upon execution, the device comprising:

a display to display the output as a bitmap;

a test routine; and a capture routine invocable by the test routine to extract data from a predefined region of the bitmap, the test routine adapted to receive the extracted data to perform a test procedure;

wherein the test procedure comprises matching the extracted data with a predetermined text string.

2. The device of claim 1, further comprising a communications client adapted to communicate with the system.

3. The device of claim 1, wherein the communications client comprises a Telnet client.

4. The device of claim 1, wherein the test routine is adapted to provide parameters defining the predefined region when invoking the capture routine.

5. The device of claim 1, wherein the output comprises a table having a first column of fields and a second column of fields.

6. The device of claim 5, wherein the predefined region is different depending on whether a field from the first column or the second column is to be extracted.

7. The device of claim 5, wherein the test routine specifies a first predefined region to extract a field from the first column and a second, different predefined region to extract a field from the second column.

8. The device of claim 1, wherein the test routine is adapted to refresh the bitmap to obtain an updated output of the software application.

9. The device of claim 8, wherein the test routine is adapted to invoke the capture routine to extract the data and to perform the test procedure after each refresh.

10. The device of claim 9, wherein the test routine is adapted to repeat invoking the capture routine and performing the test procedure until a time-out occurs.

11. The device of claim 1, wherein the test routine is adapted to provide coordinates defining the predefined region when invoking the capture routine.

12. An article comprising at least one storage medium containing instructions that when executed cause a device to:

receive a bitmap representing an output of a software application under test;

capture a value from a predefined region of the bitmap; and perform a test procedure using the captured value by matching the captured value to a predetermined text string.

13. The article of claim 12, wherein the instructions when executed cause the device to receive the bitmap in a Telnet session.

14. The article of claim 12, wherein the instructions when executed cause the device to receive the bitmap over a communications link from a system in which the software application under test is running.

15. The article of claim 12, wherein the bitmap represents a table generated by the software application under test.

16. The article of claim 12, wherein the instructions when executed cause the device to further define the predefined region by defining a rectangular region in the bitmap.

17. The article of claim 16, wherein the instructions when executed cause the device to define a first region if a first output of the software application is to be extracted and to define a second region if a second output of the software application is to be extracted.

18. The article of claim 12, wherein the instructions when executed cause the device to further provide coordinates to define the predefined region from which the value is to be captured.

19. A method of performing a test, comprising:

receiving a bitmap representing an output of a software application under test;

extracting a value from a region of the bitmap; and performing a test procedure using the extracted value, wherein performing the test procedure comprises comparing the extracted value to a text string.

20. The method of claim 19, further comprising displaying the bitmap.

21. The method of claim 19, wherein receiving the bitmap comprises a terminal receiving the bitmap over a communications link from a system in which the software application under test is executing.

22. The method of claim 21, wherein receiving the bitmap comprises receiving the bitmap in a Telnet session between the terminal and the system.

23. The method of claim 19, further comprising providing coordinates to define the region of the bitmap from which the value is to be extracted.

* * * * *